C. A. DIVINE.
COMBINED LOG SCALE, TREE CALIPERS, AND STAFF.
APPLICATION FILED FEB. 16, 1910.
973,636.
Patented Oct. 25, 1910.
2 SHEETS—SHEET 2.
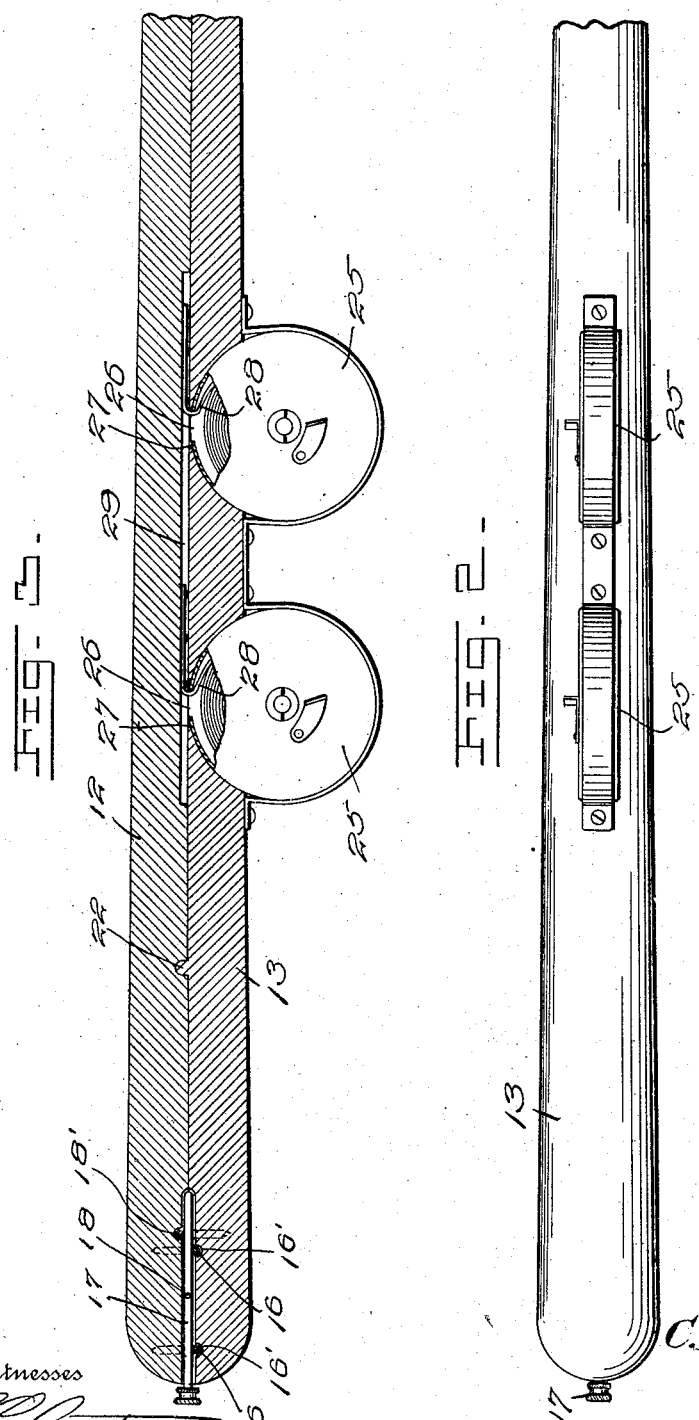

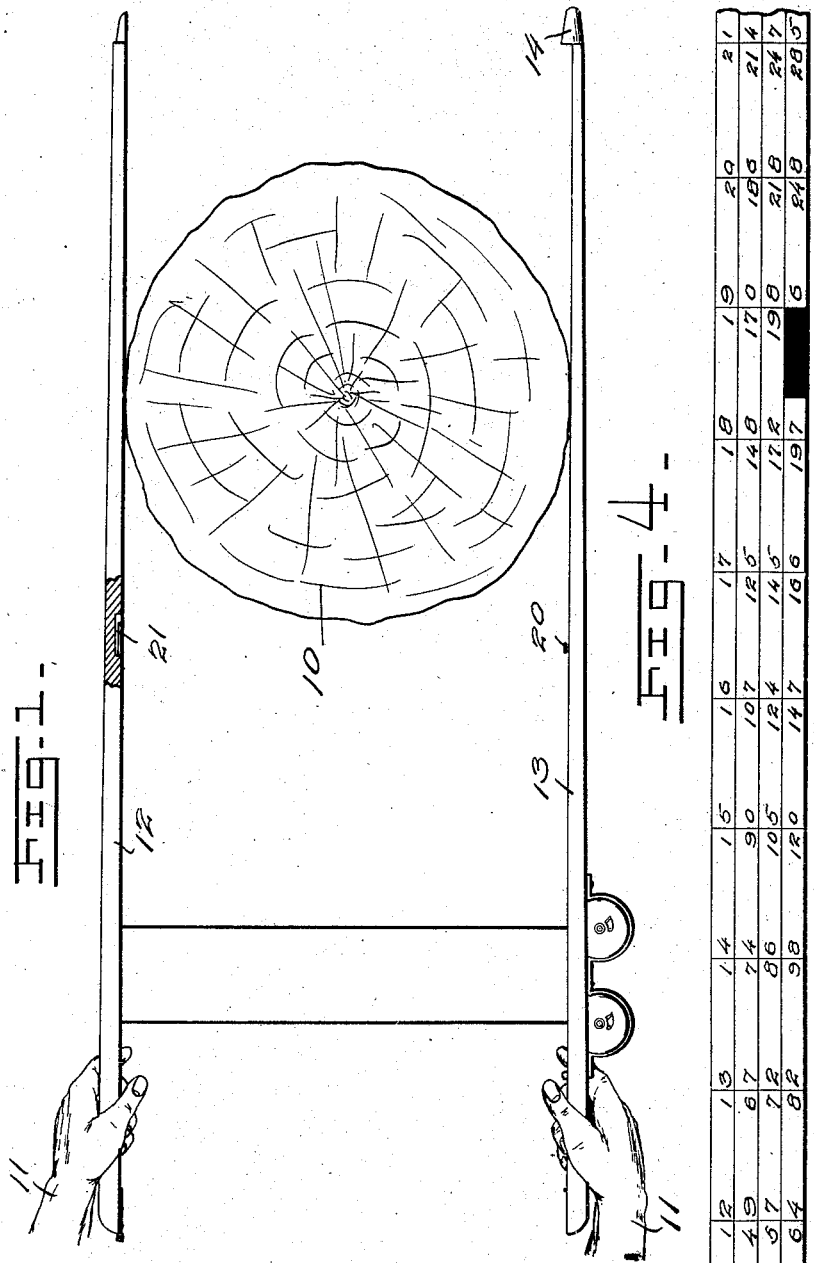

UNITED STATES PATENT OFFICE.

CHARLES A. DIVINE, OF FRANKLIN, NORTH CAROLINA.

COMBINED LOG-SCALE, TREE-CALIPERS, AND STAFF.

973,636. Specification of Letters Patent. Patented Oct. 25, 1910.

Application filed February 16, 1910. Serial No. 544,227.

*To all whom it may concern:*

Be it known that I, CHARLES A. DIVINE, a citizen of the United States, residing at Franklin, in the county of Macon and State of North Carolina, have invented certain new and useful Improvements in Combined Log-Scales, Tree-Calipers, and Staves, of which the following is a specification.

This invention relates to measuring instruments, and more particularly to calipers adapted for use by woodsmen, loggers and others having need of such an instrument and at the same time requiring a staff to assist them in their progress over rough countries in which their vocations are conducted.

A particular object of the device is to provide a novel method of constructing a caliper whereby when engaged with a log or tree the dimensions thereof will be readily discernible at a glance.

Another object is to provide such a device adapted for use upon trees of a large size, which will not be cumbersome in its construction, and which will yet be extremely durable and accurate.

Another object is to provide a novel means for securing the caliper in position for use as a walking staff.

A further object is to provide novel tape carrying means coöperating with the caliper members in their movement.

Other objects and advantages will be apparent from the following description, and it will be understood that changes in the specific structure shown and described may be made within the scope of the claims without departing from the spirit of the invention.

In the drawings: Figure 1 is a top view of the device applied to the trunk of a tree, Fig. 2 is a side elevation of the device in closed position, Fig. 3 is a longitudinal section of Fig. 2 with the tape reels partially in elevation. Fig. 4 is a plan view of a measuring tape adapted for use with these devices, which is arranged to indicate the number of square feet in logs of various length upon which the calipers are applied.

Referring to the drawings, there is shown a tree trunk 10 in section with the opposite sides of which the present device is engaged, being held in the hands of an operator 11, as shown.

The caliper comprises a tapered staff approximately two-thirds the height of a man, or more, being accurately split longitudinally to form two sections 12 and 13. The staff is slightly tapered, to approximate as nearly as possible the usual mountain staff, and one of the sections carries at its smaller extremity a ferrule 14, the opposite section of the shaft having its smaller end suitably tapered for insertion in the ferrule detachably, upon the side opposite the first section. At the enlarged end of the staff, the sections are provided with longitudinally extending grooves on their opposed plane faces, the grooves extending a suitable distance inward from the enlarged end of the staff, suitable guide staples 16 straddling the grooves of one member, and having a sliding pin 17 engaged thereunder in the grooves, said pin having a stop lug 18 formed thereon to limit its movement inward and outward.

The staple members 16 are arranged to set in proper recesses 16′ formed in the opposite section, which latter carries a locking eye or staple 18′, adjacent the inner end of the groove thereon which eye is arranged to project across the groove in the opposite member and receive the inner end of the pin 17 therein when the latter is forced to the inner limit of its movement. Thus when the lower ends of the sections are coengaged in the ferrule, and their upper ends brought into close contact, the latter ends may be fastened securely together by forcing the pin 17 inward, whereby the two will be held against lateral movement outwardly from each other. If desired, to hold the intermediate portions of the staff sections in secure contact, a bill member 20 may be carried upon the inner face of one section arranged to engage in a suitable L slot 21 in the opposite section. A tenon 22 is carried by one section and arranged to engage snugly in a suitable aperture in the opposite section, which serves to hold the two sections firmly against longitudinal movement when in contact, avoiding liability of loosening the securing means or injuring the tape as will be hereinafter described.

Carried by the section 13, there are two longitudinally spaced tape reel cases 25, set in the body of the staff section in a plane at right angles to the plane of the inner surface of the section and extending longitudinally thereof, the escape openings 26 thereof communicating with passages 27 opening through the inner face of the section, through which said openings and passages the tapes 28 pass from the reel cases, their outer ends being secured in a suitable longitudinally extending channel 29 formed in the section 12 in registry with the openings 26 and 27, as shown. Each of the tapes is similarly secured, and has the usual inch and foot scale employed in measurements of this character on one side, while one of said tapes is provided with a scale on its under side having figures arranged in sets spaced longitudinally of the tape one inch apart in alinement longitudinally of the staff with the inch divisions on the first named tape, each group of figures representing the number of square feet in logs of various standard lengths having the diameter indicated in inches upon the two tapes.

The tape cases 25 which are of any suitable construction are secured in the staff sections by means of a continuous strap of sheet metal having two approximately semicircular extensions therein encompassing respective casings 25, and being extended laterally intermediately of and outwardly of each semicircular extension. The laterally extended portions are suitably perforated for the reception of fastening members engaged in the material of the staff whereby the cases are securely held against loosening.

In use, the two sections being securely coengaged in the manner above indicated, the device may be used as a walking staff of considerable strength, aiding the operator in his movement over rough country. When it is desired to ascertain the diameter of a log or a tree, or to estimate the number of square feet of material therein, the two sections of the staff are disengaged, and their inner surfaces pressed against opposite sides of the tree or log adjacent their reduced extremities, and their enlarged portions separated until the two tapes indicate a common measure of length, on one side thereof which will represent the diameter of the tree trunk or log operated upon, while one of the tapes also indicates on its reverse side the number of square feet of lumber contained in the tree or log for the length found. The length of the tree or log may be estimated or measured in any suitable manner for the completion of the calculations.

The measuring tapes employed in carrying out the invention are properly provided with graduated lines and figures mathematically figured and properly arranged in respect to said graduated lines in a manner as clearly shown in Fig. 4 in order to obtain the results previously referred to.

What is claimed is:

1. A device of the class described comprising a split staff, a ferrule carried by one section of the latter and arranged to receive an end of the opposite section, means for securing the opposite ends of the staff sections together, and parallel measuring tapes connecting said staff sections to indicate the distance therebetween when separated.

2. A device of the class described comprising a split staff, means for detachably connecting the sections of the same, axially parallel tape carrying reels carried by one of the sections, and tapes on said reels connecting the oppositely disposed sections to indicate the distance between said sections when separated.

3. A device of the class described comprising detachable oppositely movable caliper members, means for removably connecting said members, and parallel measuring tapes comprising a connection between said members and adapted to indicate the distance therebetween when separated.

4. An article of the class described comprising detachable oppositely movable caliper members, a ferrule carried by one of said members and adapted to receive the opposite member detachably therein, guide members carried by the opposite sections and adapted to aline with each other longitudinally of the staff, a sliding pin member coöperating with the sections for detachably holding the latter together, and measuring tapes connecting the two sections for indicating the distance between the same.

In testimony whereof I affix my signature, in presence of two witnesses.

CHARLES A. DIVINE.

Witnesses:
FRED B. MOORE,
DAVID S. BUCK.